UNITED STATES PATENT OFFICE

HENRY RILEY, OF KEARNY, NEW JERSEY

PROCESS FOR TREATING YEAST

No Drawing.  Application filed April 27, 1929. Serial No. 358,754.

This invention relates to yeast and more particularly to a process for increasing the zymase in yeast and the production of a powdered zymase which has great fermenting property.

It has been found convenient to supply yeast in a powdered form or dried for bakers and other users but yeast in such forms is of slight value inasmuch as its essential properties have been destroyed during the process of manufacture. In yeast, zymase is the most beneficial constituent and the endotryptase and lipase are constituents of yeast which tend to destroy the zymase under certain conditons. These destructive elements are ineffective at low temperatures, but when the temperature of the yeast is raised, as is necessary in the drying process, the endotryptase and lipase become very powerful and readily destroy the beneficial zymase content.

The available zymase effect appears to depend primarily upon the permeability of the yeast cells and it is known that increasing the permeability of the cell walls allows a greater fermenting action. But whether this is due to the inclusion of the enzyme in the presence of its substrate into the cell is not known definitely. However, it is known that in yeast cells there exists an enzyme called endotryptase, which is also present in yeast juice. Under ordinary conditions this endotryptase attacks and destroys the zymase.

Ordinary dried yeast on the market is so carefully dried and preserved that the process does not take into account the fact that in fermentation yeast hardly grows or multiplies when it is deprived of its oxygen, and all known drying processes favor the destructive endotryptase and lipase at the expense of the zymase. Manufacturers of dry yeast all strive to keep the yeast cells alive, not taking into account the fact that yeast resists drying. These processes require expensive equipment, and the temperature used in drying the yeast cell favors the endotryptase which destroys the zymase thus making dried yeast a poor substitute for the well known commercial compressed yeast.

It is an object of the invention to provide a process for building up zymase in yeast, fixing it, drying the yeast and adding certain materials to act as stimulants to assist the fermentation.

A further object is the provision of a process for building up the zymase content of yeast.

A further object of this invention is to provide a process for increasing the zymase in use, at the same time suppressing the action of the destructive endotryptase so that the final product may be subject to drying temperatures and still retain all of its beneficial properties present at the low temperatures.

A further object of the invention is to provide a method greatly increasing the zymase content of yeast in the raw condition.

A further object is the production of a powdered zymase which may be effectively mixed with ordinary soft yeast in order to increase the zymase content of the latter.

In carrying out the invention, yeast taken from a fermentation rich in zymase is kept at a low temperature so that the zymase content will not be affected by the endotryptase and lipase present in the yeast. The yeast, which is already rich in zymase is then subjected to the action of a lipase inhibitor in such amounts and at such a time as to effectively suppress the endotryptase actively present in the yeast, as the zymase is a desirable enzyme in fermentation, and the endotryptase is not desirable in the fermentation of dough.

I have found that "Steffen's waste water" a waste product obtained during the conversion of molasses into sugar is an effective agent for the suppression of the endotryptase activity of yeast. Instead of using Steffen's waste water, excellent results may be obtained by the use of boiled yeast juice.

By the use of this waste water a considerable saving is obtained from the known way of increasing the zymase activity, that is, by using expensive stearic acid as described in Patent No. 1,651,027, February 29, 1927. The Steffen's waste water is rich in bios and it is no doubt due to these elements that it is a powerful agent for increasing zymase activity.

As an example: To one pound of yeast is added one ounce of Steffen's waste water, one gallon of water, one ounce of sugar, and this mixture is allowed to stand for twelve hours, it being stirred about every two hours. At the end of the standing period the product may be compressed in the usual manner, into cakes. It should be understood that I may use other products rich in bios as for instance, boiled yeast juice, which aims to protect the zymase for a period of time against the proteolytic action of the endotryptase. Yeast produced in this manner will give quicker fermentation in the baking process, as it is rich in the beneficial zymase and the endotryptase activity has been effectually suppressed.

In the above process instead of using sugar, other substances such as maltose, dextrose, and sugary bodies of the levulose and glucose class may be used.

Heretofore there has been known a method of fixing zymase in the yeast cell by acetone or alcohol. Heretofore no one has disclosed a method of increasing the zymase at the same time suppressing the endotryptase, and then fixing the zymase so that it may be used in place of commercial dried yeast.

It will then be seen that my process consists essentially in the building up of the zymase by the use of Steffen's waste water or yeast juice, washing the yeast and then fixing the zymase with acetone, after which it is dried at about 45 degrees F. to obtain a white powder rich in zymase. A similar powder may be obtained by precipitating Buchner's yeast juice with alcohol. This yeast juice or white powder may be added to commercial dried yeast or to commercial yeast before it is compressed to build up the zymase content without resorting to special treatment.

It is a well known fact that commercial dried yeast is about 90% dead and to such a yeast a quantity of my zymase powder may be added to revivify the dry yeast and bring it back to its original strength. Also the zymase powder or yeast juice may be used directly for baking purposes without previously combining it with dried or compressed yeast.

After the zymase has been built up in accordance with my process, fixed with acetone, and dried, it is desirable that certain mineral salts such as potassium phosphate or sodium sulphate be added, as these salts act as stimulants and assist the fermenting action of the zymase. In the example given above, one gram of potassium phosphate and 0.1 per cent of sodium sulphate would be added. Instead of adding the mineral salt I may add certain preservative substances such as a heavy concentration of maltose, dextrose, protein materials derived from cereals, sugary bodies of the levulose and glucose class. The addition of such preservatives prevents further action of any endotryptase which may remain in the yeast.

From the above description it will be seen that I have presented a practicable method of fixing the zymase content of yeast. The zymase may be fixed by acetone, alcohol or ether, and it is preferable that the zymase be built up before it is fixed.

Heretofore, a powdered zymase adapted to be used in place of commercial dried yeast has not been available on the market, chiefly because no practical commercial method was known for building up the zymase and for fixing. The process herein disclosed enables the production of a powdered zymase for commercial purposes which may be used in place of commercial dried yeast or added to compressed yeast for building up the zymase content.

Having thus described my invention, what I claim as new and desire to secure by Letters Patent, is:

1. The process of making a dried yeast, comprising allowing yeast to stand in a mixture of Steffen's waste water and a dilute solution of sugar, intermittently stirring the mixture, adding acetone to the mixture, then drying the mixture, and then adding potassium phosphate and sodium sulphate.

2. The process of making dried yeast, comprising allowing yeast to stand in yeast juice and a dilute solution of sugar, intermittently stirring the mixture, adding acetone, and then drying the mixture.

3. The process of making a dried yeast, comprising adding to one pound of yeast one gallon of water and one ounce of sugar and one ounce of Steffen's waste water, allowing the mixture to stand with intermittent stirring for about 12 hours, adding acetone, then drying the mixture at a temperature of about 45° F.

4. The process of making a dried yeast, comprising adding to one pound of yeast one gallon of water and one ounce of sugar and one ounce of Steffen's waste water, allowing the mixture to stand with intermittent stirring for about 12 hours, adding acetone, then drying the mixture at a temperature of about 45° F., then adding one gram of potassium phosphate and 0.1 per cent of sodium sulphate.

This specification signed this 25th day of April 1929.

HENRY RILEY.